US008767963B2

(12) United States Patent
Huang (10) Patent No.: US 8,767,963 B2
(45) Date of Patent: Jul. 1, 2014

(54) METHOD FOR ENCRYPTING SHORT MESSAGE OF MOBILE COMMUNICATION

(75) Inventor: Yu-Chang Huang, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 0 days.

(21) Appl. No.: 13/543,021

(22) Filed: Jul. 6, 2012

(65) Prior Publication Data

US 2013/0208889 A1     Aug. 15, 2013

(30) Foreign Application Priority Data

Feb. 14, 2012   (TW) .............................. 101104660 A (51) Int. Cl.
*H04L 9/00* (2006.01)
(52) U.S. Cl.
USPC ........................................... 380/270; 713/160
(58) Field of Classification Search
None
See application file for complete search history.

(56) References Cited

U.S. PATENT DOCUMENTS

| 8,442,231 B2 * | 5/2013 | Macchi ........................ 380/270 |
| 8,457,308 B2 * | 6/2013 | Tsan .............................. 380/44 |
| 2004/0030906 A1 * | 2/2004 | Marmigere et al. .......... 713/189 |

FOREIGN PATENT DOCUMENTS

WO     WO 01/95558 A1     12/2001

OTHER PUBLICATIONS

Hassinen et al., End-to-end Encryption for SMS Messages in the Health Care Domain, EN MI, 2005, pp. 316-321.*
Hassinen et al., Secure SMS messaging using Quasigroup encryption and Java SMS API, 2003.*

* cited by examiner

*Primary Examiner* — Minh Dinh
(74) *Attorney, Agent, or Firm* — Muncy, Geissler, Olds & Lowe, P.C.

(57) ABSTRACT

The present invention relates to a method for encrypting a short message in mobile communication. According to the present invention, a user first inputs short-message content and a short-message password to a first communication electronic device. Then the first communication electronic device writes the short-message content to a short-message packet according to a short-message protocol, configures a set of unused parameters of the short-message packet as a set of encryption parameters according to the short-message protocol, and configures the short-message password to the set of encryption parameters for transmitting the short-message packet containing the set of encryption parameters to a second communication electronic device. Thereby, according to the present invention, the short message is encrypted. After the user of the second communication electronic device receives the short message, he cannot read the received short message unless he inputs the correct password to the second communication electronic device.

9 Claims, 6 Drawing Sheets

METHOD FOR ENCRYPTING SHORT MESSAGE OF MOBILE COMMUNICATION

FIELD OF THE INVENTION

The present invention relates generally to a method for encrypting, and particularly to a method for encrypting a short message of mobile communication.

BACKGROUND OF THE INVENTION

In recent years, the communication technologies adopted by communication electronic devices have developed from the first generation (1G) mobile communication technology to the fourth generation (4G) mobile communication technology for improving the quality of mobile communication, increasing the data transmission quantity of mobile communication, and providing more communication functions, and hence providing more convenience for users. In continuously improving and developing mobile communication technologies, short message service is still indispensable because it provides the users of communication electronic devices with an alternative communication method when they cannot contact the others real-timely through phone calls. In addition, short message service keeps improving as well, enriching the content of short messages. For example, based on short message service, multimedia message service (MMS) improves and provides another kind of short message service so that the users of communication electronic devices can transmit not only text but also multimedia files, such as photos, voice, or video, to remote users.

Accordingly, all current communication electronic devices have short message functions for enabling users to transmit communication content to remote users through short message service under the circumstance of inconvenience in using phone calls. No matter whether short messages having commercial confidentiality or personal privacy, people usually need to transmit such short messages in situations when using phone calls is not convenient. For example, two users of communication electronic devices are situated in the environment where noise is not allowed. Alternatively, users in a noisy environment, in which the listener cannot recognize the speech content clearly, and their conversation can only proceed using the text of short messages. In addition, the content of the conversation between two users, such as technical content or private account and password, can even be inappropriate to be disclosed in the public. For avoiding divulgence through spoken language, the conversation can only be performed using the text of short messages.

There are many communication technologies in our lives include encryption mechanism for ensuring the security of data transmission and prevent data from misappropriation. The most common encryption method is to set a password during the usage activation process of communication electronic devices. In the process, the user first enters a preset page, in which he has to input the password before using the communication electronic device. For example, in commercial mobile phones, a serial code corresponding to a subscriber identity module card (SIM card) is set as the activation code at start. The user has to input the serial code before he can activate the mobile phone. If the user inputs the incorrect serial code, the mobile phone will not be activated. Beside, a general communication electronic device can further let the user set a self-defined password as the activation code of the communication electronic device.

The encryption method described above can only protect communication electronic devices against activation by others but not protecting the short messages. If a user lends his communication electronic device to another after activation for using its functions, such as making phone calls, sending short messages, using the movie playback function of multimedia functions, browsing or accessing emails via mobile network by using communication electronic devices, and playing the games downloaded in communication electronic devices. At this time, if the communication electronic devices receive a short message, the short message may be opened and read by the other person owing to lack of protection measures during the reading process of short message in the communication electronic device. Consequently, private short messages, particularly those concerning account and password or other important information, might be read.

Although an encryption method has been developed presently for protecting short messages, a hardware circuit is required in the communication electronic device. In addition, when the communication electronic device reads short messages, it has to restore the short-message content, and hence increase its computational complexity, which burdens the computational circuitry and reduces the operational performance of the communication electronic device.

Accordingly, the present invention provides a method for encrypting a short message of mobile communication, which improves the problems of message being stolen owing to inability in encrypting the short message and avoids increase in computational complexity of a communication electronic device.

SUMMARY

An objective of the present invention is to provide a method for encrypting a short message of mobile communication, which enables a communication electronic device to encrypt the short message sent, so that the appointed receiver can enter the corresponding password for reading the short message and the third party having no corresponding password cannot. Thereby, the security of reading short messages can be ensured.

Another objective of the present invention is to provide a method for encrypting a short message of mobile communication, which improves the computational complexity during encrypting process, and reduce the circuit area used for encryption computation.

The present invention provides a method for encrypting a short message of mobile communication, which enables the user sending the short message to encrypt the sent short message. First, the user inputs short-message content and a short-message password to a first communication electronic device. The first communication electronic device configures a set of unused parameters of a short-message packet corresponding to the short-message content according to a short-message protocol as a set of encryption parameters. After the first communication electronic device configures the set of encryption parameters, it configures the short-message password to the set of encryption parameters. At last, the first communication electronic device writes the short-message content inputted by the user to the encrypted short-message packet and sends the encrypted short-message packet to a second communication electronic device. Thereby, after the second communication electronic device receives the encrypted short-message packet, the correct corresponding password has to be inputted for the encrypted short-message packet before reading the received short-message packet. Accordingly, the situation in which the short-message content is received and read by another person can be avoided

DETAILED DESCRIPTION

In order to make the structure and characteristics as well as the effectiveness of the present invention to be further understood and recognized, the detailed description of the present invention is provided as follows along with embodiments and accompanying figures.

Figure 1:
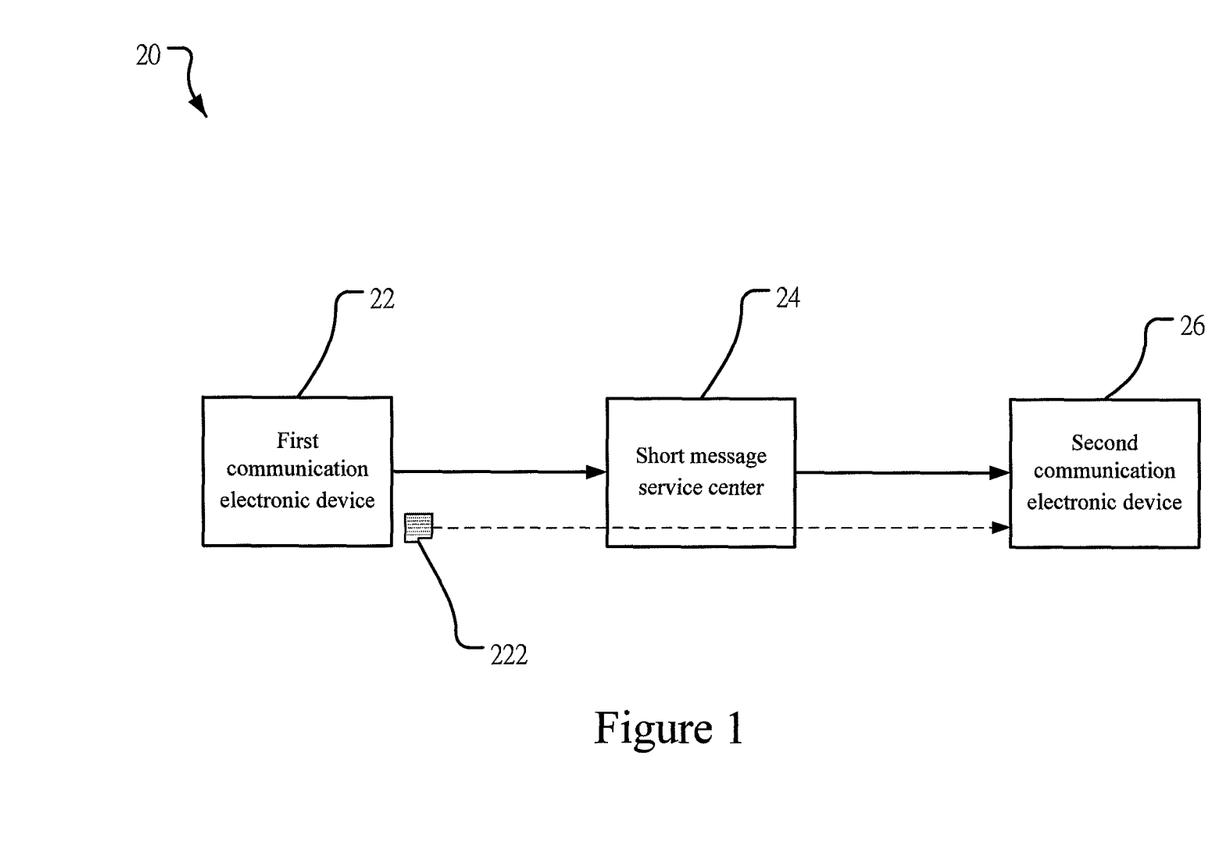
FIG. 1 shows a block diagram according to an embodiment of the present invention.

FIG. 1 shows a block diagram according to an embodiment of the present invention. As shown in the figure, a communication system 20 according to the present invention comprises a first communication electronic device 22, a short message service center 24, and a second communication electronic device 26 for applying the short message service of mobile communication technology. The first communication electronic device 22 is connected to the short message service center 24 via a communication network (not shown in the figure), for example, the global system for mobile communications (GSM) or the Internet, and transmits an encrypted short-message packet 222 to the short message service center 24. The second communication electronic device 26 is also connected to the short message service center 24 via the communication network. Thereby, the short-message packet 222 transmitted by the first communication electronic device 22 is forwarded to the second communication electronic device 26 via the short message service center 24. According to the present embodiment, the short message service center 24 is a server to which a plurality of communication electronic devices can connect. This server is used for processing the transmission of short messages or other messages such as push mail service.

Refer again to FIG. 1. The first communication electronic device 22 produces a short-message packet 222 according to a short-message protocol and the short-message content inputted by the user, and transmits the short-message packet 222 to the short message service center 24 via the mobile communication network for transmitting the short-message packet 222 to the second communication electronic device 26 through the short message service center 24. The first communication electronic device 22 according to the present embodiment is a mobile phone, a tablet computer, or a personal computer; the second communication electronic device 26 is a mobile phone, a tablet computer, or a personal computer. The short-message content stored in the short-message packet 222 is 7-, 8-, or 16-bit data. The short-message protocol according to the present embodiment is Digital cellular telecommunications system (Phase 2+); Technical realization of the Short Message Service (SMS) Point-to-Point (PP) (3GPP TS 03.40 version 7.5.0 Release 1998) regulated by European Telecommunications Standards Institute. Nonetheless, the above description is only an embodiment of the present invention. The present invention is not limited to the short-message protocol.

Figure 2:
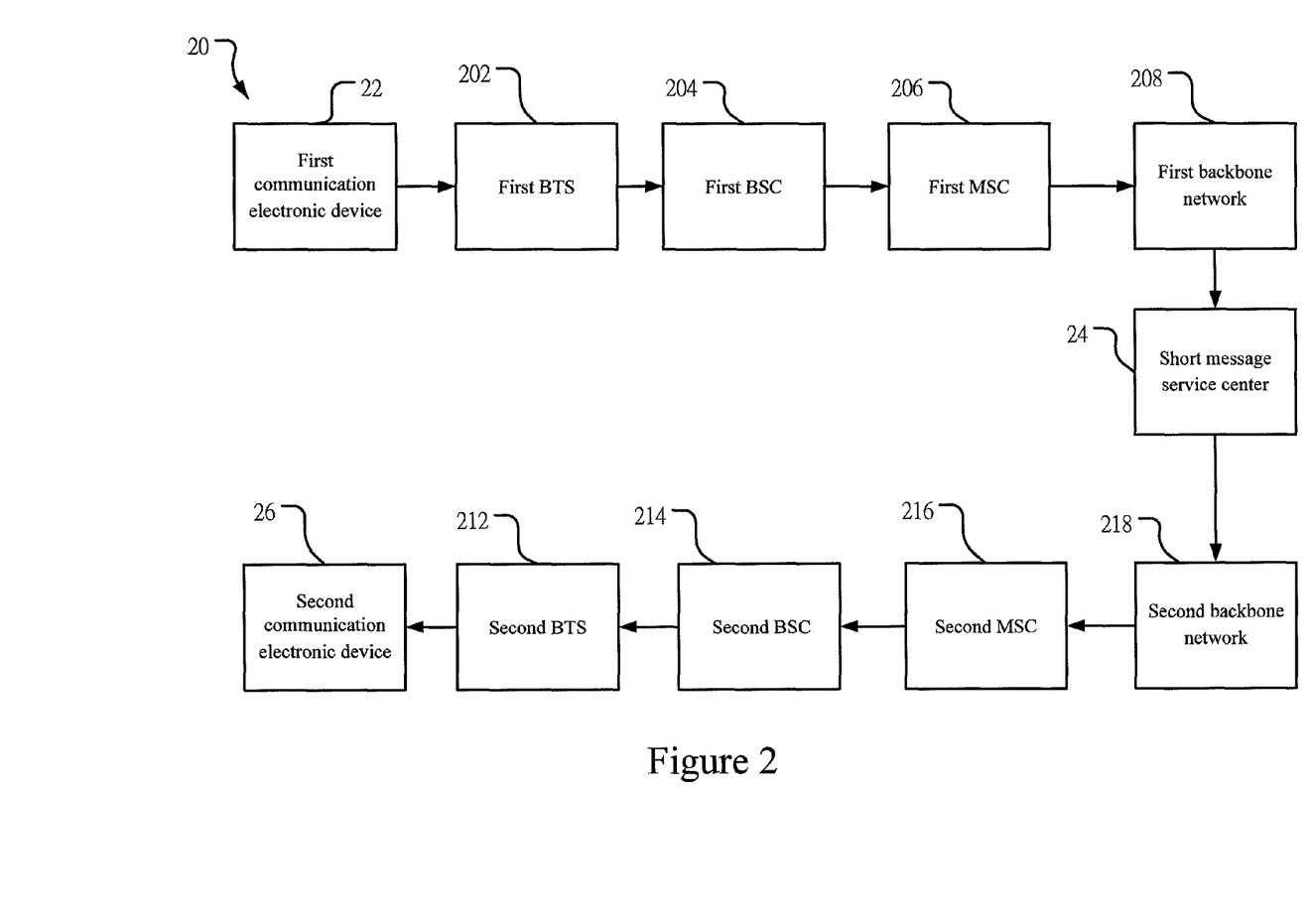
FIG. 2 shows a detailed block diagram of the embodiment of FIG. 1 according to the present invention.

FIG. 2 shows a detailed block diagram of the embodiment of FIG. 1 according to the present invention. As shown in the figure, the communication system 20 according to the present invention comprises, in addition to the first communication electronic device 22, the short message service center 24, and the second communication electronic device 26, a first base transceiver station (BTS) 202, a first base station controller (BSC) 204, a first mobile switching center (MSC) 206, a first backbone network 208, a second BTS 212, a second BSC 214, a second MSC 216, and a second backbone network 218. The first communication electronic device 22 is connected to the short message service center 24 via the first BTS 202, the first BSC 204, the first MSC 206, and the first backbone network 208; the short message service center 24 is connected to the second communication electronic device 26 via the second backbone network 218, the second MSC 216, the second BSC 214, and the second BTS 212 for transmitting the short-message packet 222 to the second communication electronic device 26.

Refer again to FIG. 2. After the first communication electronic device 22 sets the short-message password to the header of the short-message packet 222 and writes the short-message content to the short-message packet 222, it transmits the encrypted short-message packet 222 to the first BTS 202. The first BTS 202 transmits the received encrypted short-message packet 222 to the corresponding first BSC 204 for transmitting the encrypted short-message packet 222 to the first backbone network 208 via the first MSC 206 and to the short message service center 24. The first and second communication electronic devices 22, 26 according to the present embodiment are mobile phones. The first backbone network 208 includes a gateway GPRS support node (GGSN) and a serving GPRS support node (SGSN). In the above embodiment, the path by which a mobile phone sends the short-message packet 222 to another mobile phone starts from the first communication electronic device 22 through the first BTS 202, the first BSC 204, the first MSC 206, the first backbone network 208, the short message service center 24, the second backbone network 218, the second MSC 216, the second BSC 214, and the second BTS 212 to the second communication electronic device 26. The transmission process of the short-message packet 222 is well known according to the prior art. In the present embodiment, therefore, the detailed connection will not be described again.

Figure 3:
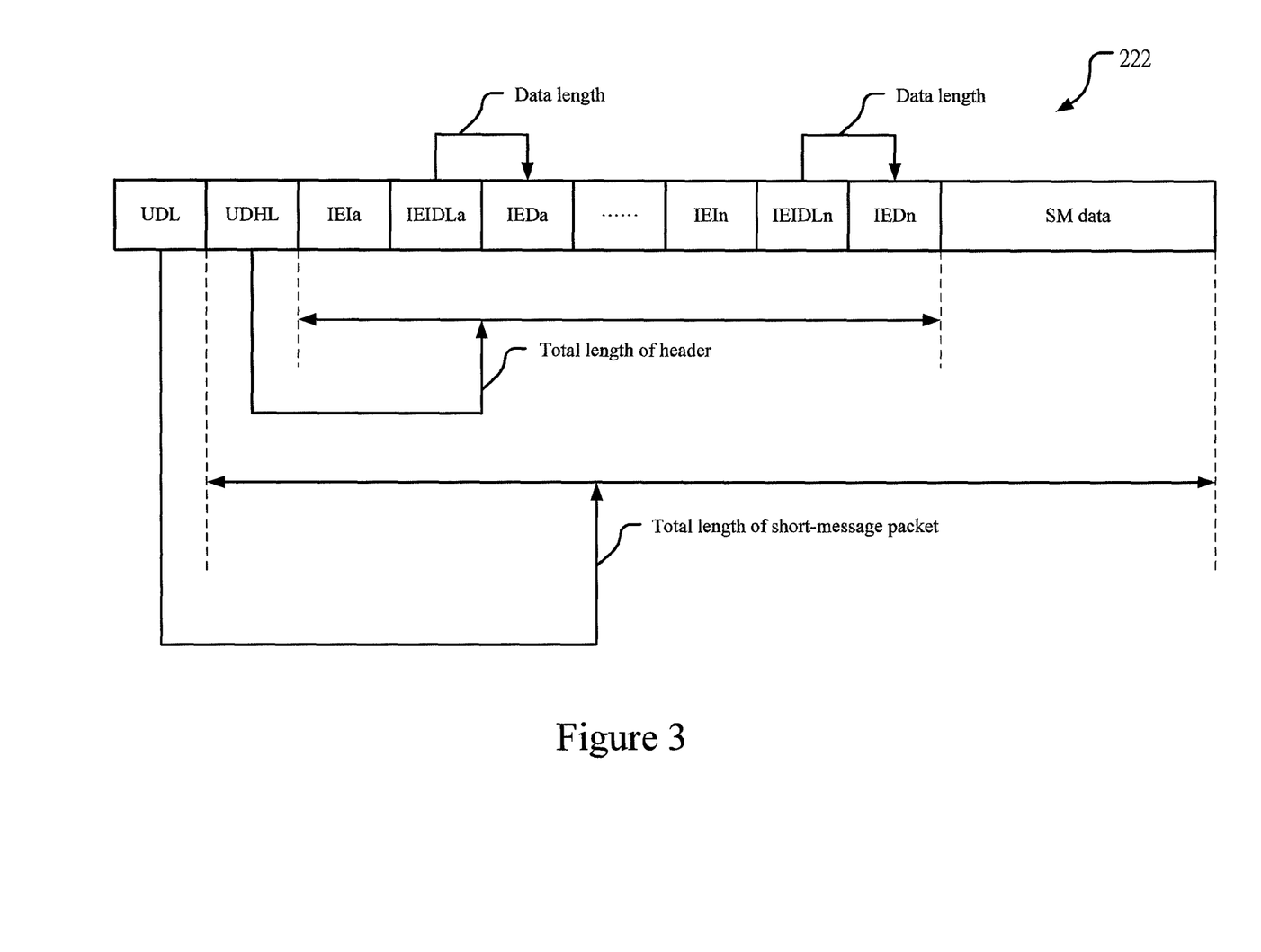
FIG. 3 shows a schematic diagram of a short-message packet according to embodiment of the present invention.

As shown in FIG. 3, the short-message packet 222 according to the present embodiment contains 8-bit data for the short-message content. The first communication electronic device 22 produces the short-message packet 222 according to the short-message protocol. Besides, the short-message packet 222 is the transfer protocol user data (TPUD) defined by the short-message protocol. The short-message packet 222 includes a header and short-message data SM Data. The header includes a plurality of sets of parameters with each set containing an information element identifier (IED parameter, a length parameter of information element (IEIDL), and an information element data (IED) parameter. The user data length (UDL) represents the total data length of the short-message packet 222, namely, the total data length of the header and the SM data; the user data header length (UDHL) represents the total length of the header; the IEI parameter represents the control data of the short message; the IED parameter represents the control data of the short message; and IEIDL parameter represents the data length of the IEL parameter. The SM data in the short-message packet 222 is just the short-message content inputted by the user.

The short-message protocol includes a plurality of sets of reserved parameters, which are not defined nor used, and are unused parameter sets. For example, in the short-message protocol of Digital cellular telecommunications system (Phase 2+); Technical realization of the Short Message Service (SMS) Point-to-Point (PP) (3GPP TS 03.40 version 7.5.0 Release 1998), the plurality sets of reserved parameters include 02, 0A to 6F, A0 to BF, and E0 to FF. According to the present invention, the first communication electronic device 22 configures one of the unused parameter sets as a set of encryption parameters and adds it to the header of the short-message packet 222. Meanwhile, the short-message password is set to the set of encryption parameters for encrypting the short-message packet 222. In the following, the method how the first communication electronic device 22 configures the set of encryption parameters will be described.

According to an embodiment of the present invention, when the first electronic device 22 encrypts a short message, it adds the corresponding set of reserved parameters of the IEI parameter E0 to the header of the short-message packet 222, and sets the corresponding set of reserved parameters corresponding of the IEI parameter E0 as an encryption control parameter. In other words, the corresponding set of unused parameters of the reserved parameter E0 is added to the header and set as a set of encryption parameters for encrypting the corresponding short-message packet 222. Thereby, when the first communication electronic device 22 encrypts the short message, it sets the IEI parameter E0 to the header and sets the short-message password as the IED parameter. In addition, the data length of the short-message password is set as the IEIDL parameter. Accordingly, the first communication electronic device 22 encrypts the short-message packet 222 before sending the short message.

Figure 4:
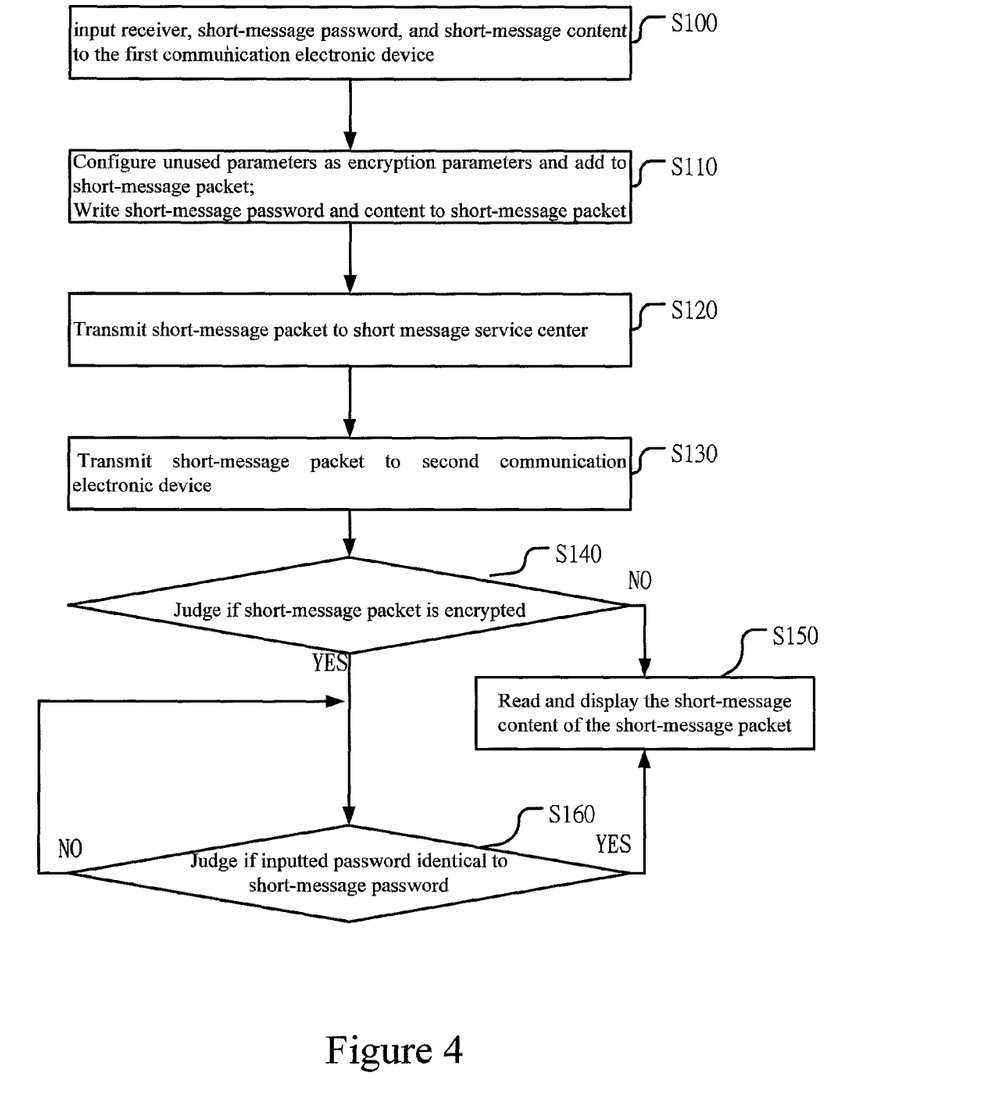
FIG. 4 shows a flowchart according to an embodiment of the present invention.
Figure 5:
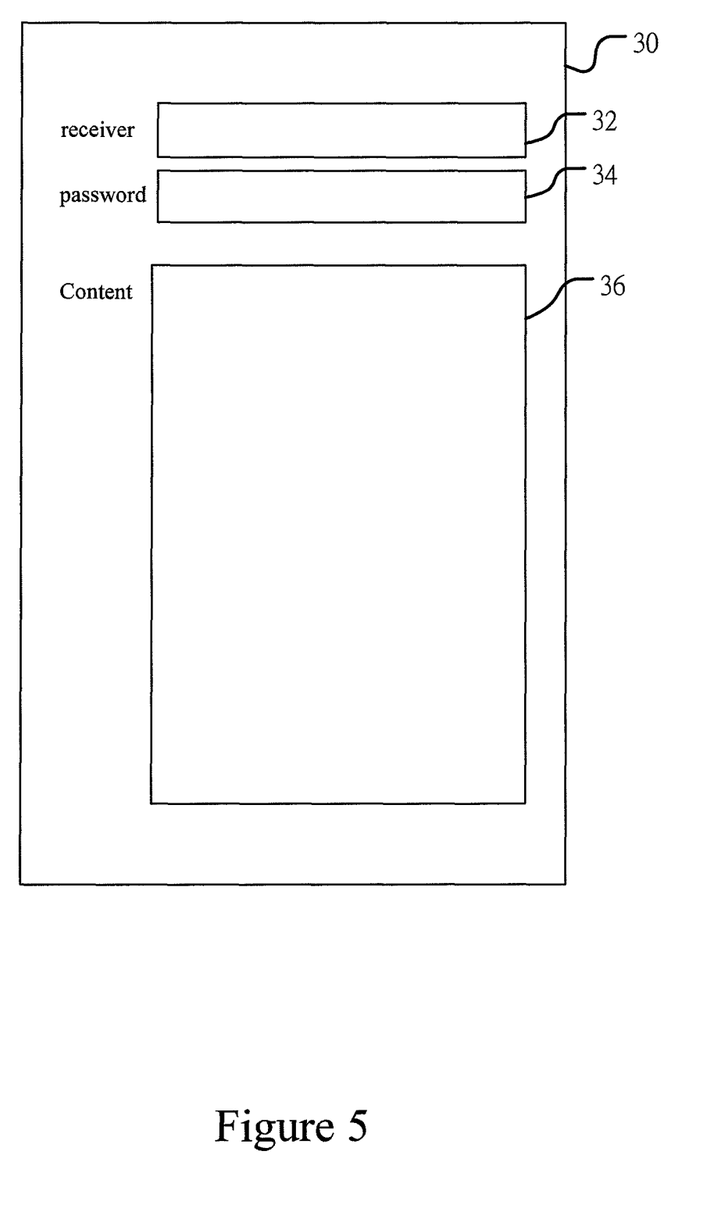
FIG. 5 shows a schematic diagram of the input interface for a short message according to an embodiment of the present invention.

FIG. 4 shows a flowchart according to an embodiment of the present invention. As shown in the figure, the method for encrypting a short message of mobile communication according to the present invention can encrypt the short messages transmitted between communication electronic devices. As shown in the step S100, firstly, the user operates the first communication electronic device 22 such as a mobile phone or a tablet computer for displaying a short-message input interface 30 as shown in FIG. 5. That is, the short-message input interface 30 is displayed on said first communication electronic device, wherein the short-message input interface 30 comprises a receiver field 32, a password field 34, and a short-message content field 36. The receiver field 32 corresponds to a communication number of the second communication electronic device 26. The password field 34 corresponds to the short-message password. The short-message content field 36 corresponds to the short-message content to be sent. The short-message password to be configured is inputted to the password field 34 and the communication number, for example, the mobile phone number, of the second communication electronic device 26 is inputted to the receiver field 32. Then, as shown in the step S110, the first communication electronic device 22 configures a set of unused parameters of the short-message packet 222 as a set of encryption parameters according to the short-message protocol, and sets the short-message password inputted by the user to the set of encryption parameters. Besides, the first communication electronic device 22 also writes the short-message content inputted by the user to the SM data of the short-message packet 222, as shown in FIG. 3.

Next, as shown in the step S120, the first communication electronic device 22 transmits the short-message packet 222 encrypted in the step S110 to the short message service center 24. As shown in the step S130, the short message service center 24 transmits the encrypted short-message packet 222 to the second communication electronic device 26. In the step S140, the second communication electronic device 26 judges if the short-message packet 222 has the encryption control parameter E0 and thereby judging if the short-message packet 222 is encrypted. If not, the step S150 is executed, in which step the second communication electronic device 26 reads the short-message content of the short-message packet 222. If yes, the step S160 is executed. In the step S160, the second communication electronic device 26 requests the user to enter the password and judges if the inputted password is identical to the stored short-message password in the short-message packet 222. If yes, the second communication electronic device 26 executes the step S150. If not, the second communication electronic device 26 executes the step S160.

It is known from the above that the communication system 20 according to the present invention configures the header of the short-message packet 222 for encrypting the short-message packet 222. Thereby, when the user lends his first communication electronic device 22 to another person, the situation in which the latter person receives and reads the user's short messages, which may contain private messages such as personal account and password, can be prevented and thus improve the encryption function of short messages. In addition, because the present invention configures a set of unused parameters in the header of the short-message packet 222 as a set of encrypted parameter for providing encryption verification for short messages, the operational load of the communication electronic device is not increased. Moreover, no hardware circuitry is required for encryption operations.

Figure 6:
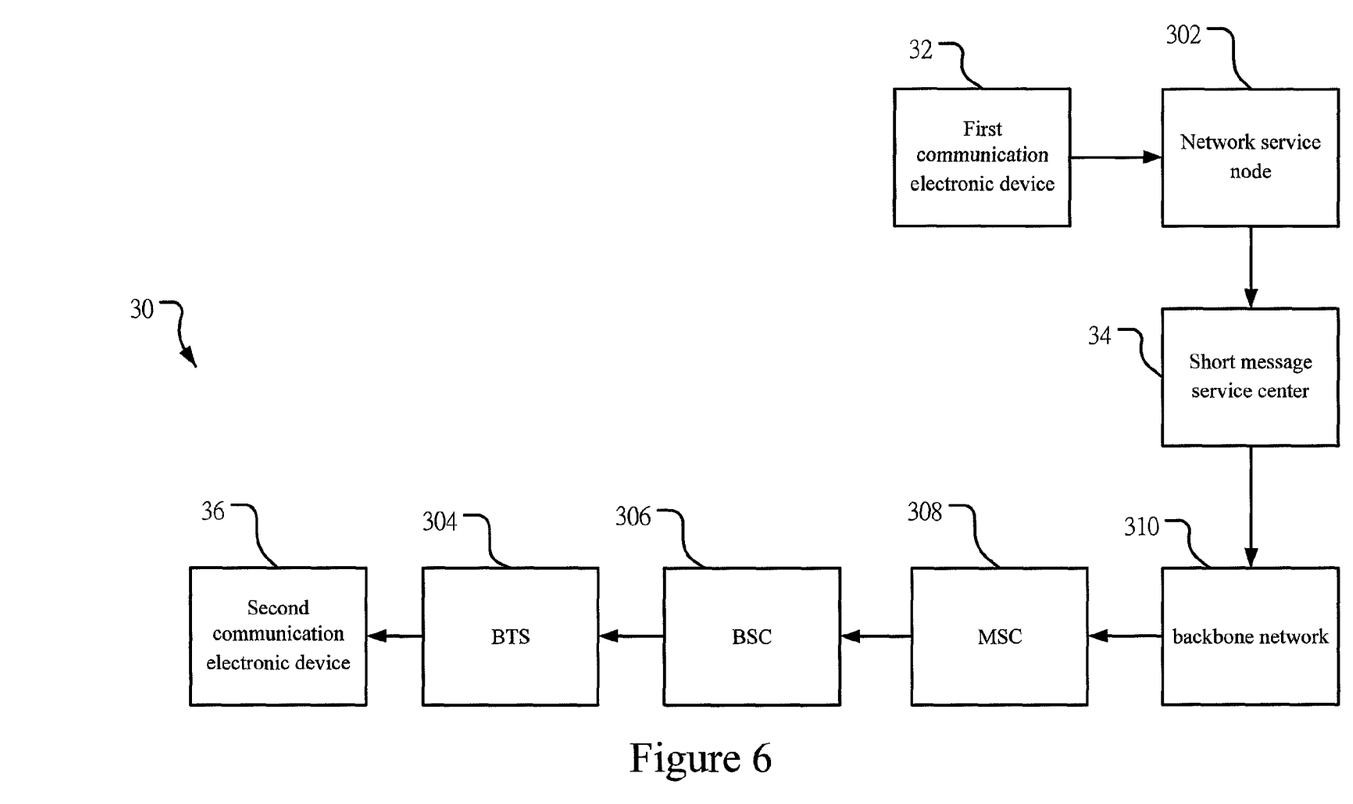
FIG. 6 shows a block diagram according to another embodiment of the present invention.

FIG. 6 shows a block diagram according to another embodiment of the present invention. As shown in the figure, the communication system 30 according to the present invention can be further applied to a personal computer connecting a multi-functional mobile network card and used as the short-message transmitting side. The communication system 30 comprises a first communication electronic device 32, a short message service center 34, and a second communication electronic device 36. The communication system 30 further comprises a network service node 302, a BTS 304, a BSC 306, a MSC 308, and a backbone network 310.

The first communication electronic device 32 according to the present embodiment is a personal computer, which can connect electrically to a multi-functional mobile network card (not shown in the figure) for connecting to the mobile network or the Internet. According to the present embodiment, the second communication electronic device 36 is a mobile phone. Thereby, the personal computer in the present embodiment sends short messages to the mobile phone. The network service node 302 is the network node of the mobile network or the Internet connected by the personal computer 32 so that the first communication electronic device 32 can connect to the short message service center 34. Because the connection of the short message service center 34 to the second communication electronic device 36 is equivalent to the connection of the short message service center 24 to the second communication electronic device 26 according to the previous embodiment, the connection will be not described again in details.

Furthermore, the process of the present embodiment of using the first communication electronic device 32 to transmit the encrypted short-message packet 222 to the second communication electronic device 36 is the same as the flowchart shown in FIG. 4. That is, according to the step S100, the personal computer 32 produces the encrypted short-message packet 222. Then, following the steps S110 to S130, the personal computer 32 transmits the encrypted short-message packet 222 to the second communication electronic device 36. Next, as shown in the step S140, the second communication electronic device 36 judges if the received short-message packet 222 is encrypted. If not, the step S150 is executed for reading the short-message content of the short-message packet 222 directly. If yes, the step S160 is executed. Because the short-message packet 222 according to the present embodiment is an encrypted packet, the second communication electronic device executes the steps S160 for judging if the password inputted by the user is identical to the short-message password of the short-message packet 222. If not, the second communication electronic device 36 does not read the short-message content of the short-message packet 222, and then continues to execute the step S160. If yes, the second communication electronic device 36 executes the step S150 for reading the short-message content of the short-message packet 222.

Accordingly, in addition to the application of the short message transmission between mobile phones, the method for encrypting a short message of mobile communication according to the present invention can be further applied to the short message transmission between a personal computer and a mobile phone. In addition to the two embodiments described above, because a current multi-functional mobile network card enables a personal computer to connect to the mobile network directly for receiving and sending short messages, the present invention can be further applied to the short message transmission between personal computers, between notebook computers, or between a mobile phone and a personal computer.

To sum up, the present invention provides a method for encrypting a short message of mobile communication. According to the present invention, communication electronic devices need not to increase their hardware circuitry before encrypting short messages. With encryption, during the time when a mobile phone is lent to another person for entertainment or browsing purposes, important short-message content will not be disclosed. Besides, the present invention further configures the short-message password to the header of the short-message packet for reducing the complexity of encrypting short messages as well as the operational load during the encryption process of a communication electronic device.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A method for encrypting a short message of mobile communication, comprising steps of:
   inputting short-message content to a first communication electronic device;
   inputting a short-message password to said first communication electronic device;
   said first communication electronic device configuring a set of unused parameters of a short-message packet as a set of encryption parameters according to a short-message protocol, and assigning said short-message password to said set of encryption parameters; and
   writing said short-message content to said short-message packet according to said short-message protocol for transmitting said short-message packet to a second communication electronic device.

2. The method for encrypting a short message of mobile communication of claim 1, wherein said first communication electronic device transmits said short-message packet to a short message service center for transmitting said short-message packet to said second communication electronic device.

3. The method for encrypting a short message of mobile communication of claim 1, wherein said second communication electronic device judges if an inputted password is identical to said short-message password according to said set of encryption parameters, and when said second communication electronic judges that said inputted password is identical to said short-message password, said second communication electronic device reads and displays said short-message content according to said short-message packet.

4. The method for encrypting a short message of mobile communication of claim 1, wherein said second communication electronic device judges if an inputted password is identical to said short-message password according to said set of encryption parameters, and when said second communication electronic judges that said inputted password is not identical to said short-message password, said second communication electronic device does not read said short-message content.

5. The method for encrypting a short message of mobile communication of claim 1, wherein said set of unused parameters comprises an information element identifier parameter, a length parameter of information element, and an information element data parameter.

6. The method for encrypting a short message of mobile communication of claim 5, wherein said set of unused parameters is a set of reserved parameters of said short-message protocol.

7. The method for encrypting a short message of mobile communication of claim 5, wherein said first communication electronic device stores said short-message password to the field of said information element data parameter in said step of assigning said short-message password to said set of encryption parameters.

8. The method for encrypting a short message of mobile communication of claim 1, and, further comprising a step of displaying a short-message input interface on said first communication electronic device, wherein said short-message input interface comprises a receiver field, a password field, and a short-message content field with said receiver field corresponding to a communication number of said second communication electronic device, said password field corresponding to said short-message password, and said short-message content field corresponding to said short-message content.

9. The method for encrypting a short message of mobile communication of claim 1, wherein said short-message content is 7-, 8-, or 16-bit data.

* * * * *